Nov. 20, 1923.  1,475,043
E. A. DAVIGNON ET AL
ATTACHMENT FOR COMBING MACHINES
Filed July 23, 1921
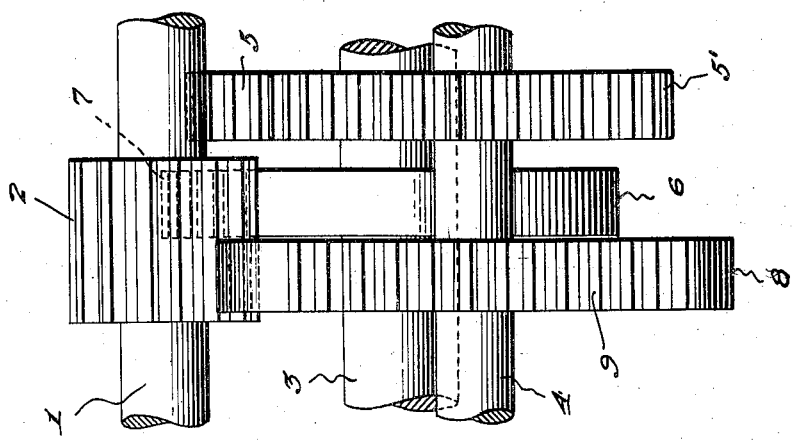
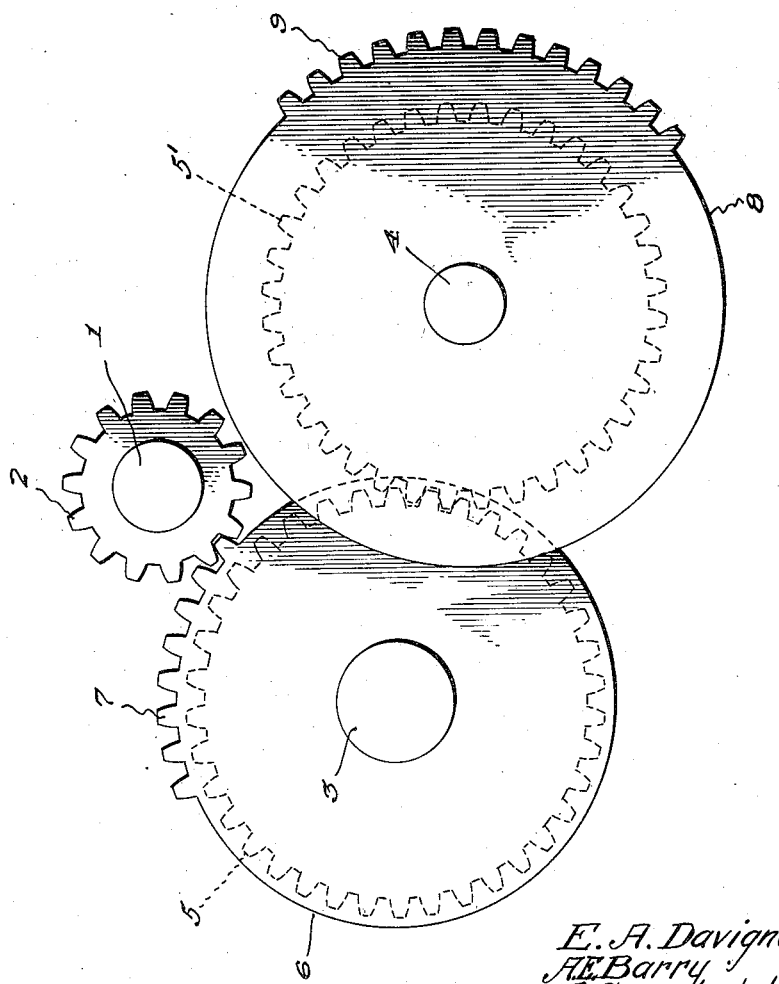
E. A. Davignon
A. E. Barry
J. Greenhalgh INVENTORS
BY Victor J. Evans
ATTORNEY
WITNESS:

Patented Nov. 20, 1923.

1,475,043

UNITED STATES PATENT OFFICE.

EDMOND A. DAVIGNON, ARTHUR E. BARRY, AND JAMES GREENHALGH, OF PLAINFIELD, CONNECTICUT.

ATTACHMENT FOR COMBING MACHINES.

Application filed July 23, 1921. Serial No. 487,153.

*To all whom it may concern:*

Be it known that we, EDMOND A. DAVIGNON, ARTHUR E. BARRY, and JAMES GREENHALGH, citizens of the United States, residing at Plainfield, in the county of Windham and State of Connecticut, have invented new and useful Improvements in Attachment for Combing Machines, of which the following is a specification.

This invention relates to improvements in combing machines, the principal object of the invention being to provide simple means for driving the drawing off or detaching roll.

Another object of the invention is to reduce vibration so that the machine can be driven at a greater speed and with less power.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a diagrammatic front view of the invention.

Figure 2 is a side elevation.

In these views 1 indicates the detaching roll which is provided with a gear 2 and 3 indicates the cylinder shaft which is geared to the cross shaft 4 by the gears 5 and 5'. A disc 6 is connected with shaft 3 and this disc is provided with a number of teeth 7 on a part of its circumference for engaging the gear 2. A disc 8 is connected with shaft 4 and this disc is provided with a number of teeth 9 for engaging gear 2. The drawing shows eight teeth on disc 6 and 13 on disc 8, the teeth being so arranged with the other driving parts that the detaching roll 1 will be given a two-thirds revolution in a forward direction and one-third of a revolution in a rearward direction. Thus the roll is caused to perform its function of detaching and attaching the fibers.

The backward motion takes place when the teeth 7 of disc 6 are in mesh with gear 2 and as soon as these teeth are out of mesh with the gear the teeth 9 of disc 8 come into mesh with the gear to drive the roll 1 forward. This disc 8 on shaft 4 is driven from the cylinder shaft 3.

By the use of our arrangement of parts a very complicated assembly is done away with so that the cost of manufacture is greatly reduced as is also the cost of repairing. The machine can be driven with less power and has less vibration so that it can be driven at greater speed.

It is thought from the foregoing description that the advantages and novel features of the invention will be readily apparent.

We desire it to be understood that we may make changes in the construction and in the combination and arrangement of the several parts, provided that such changes fall within the scope of the appended claim.

What we claim is:—

A driving mechanism for the detaching roll of a combing machine comprising a shaft geared to the cylinder shaft of the machine, a long gear on the detaching roll, a disc on the cylinder shaft having a number of teeth on a part of its circumference for engaging the gear on the detaching roll and a disc on the first mentioned shaft having a number of teeth on a part of its periphery for engaging the gear on the detaching roll, the teeth on the second disc being greater in number than those on the first disc and said discs overlapping each other with the overlapping parts located under the long gear.

In testimony whereof we affix our signatures.

ARTHUR E. BARRY.
JAMES GREENHALGH.
EDMOND A. DAVIGNON.